INVENTOR
C. K. N. PATEL
BY
*Wilford L. Wisner*
ATTORNEY

United States Patent Office 3,450,997
Patented June 17, 1969

3,450,997
PARAMETRIC APPARATUS EMPLOYING ELEMENTAL TELLURIUM OR SELENIUM OR BOTH
Chandra K. N. Patel, Chatham, N.J., assignor to Bell Telephone Laboratories, Incorporated, Murray Hill and Berkeley Heights, N.J., a corporation of New York
Continuation-in-part of abandoned application Ser. No. 515,981, Dec. 23, 1965. This application Apr. 29, 1968, Ser. No. 733,189
Int. Cl. H03f 7/00; H03d 9/00
U.S. Cl. 330—4.5                                                   20 Claims

ABSTRACT OF THE DISCLOSURE

The disclosed second harmonic generators, parametric oscillators, parametric amplifiers and the disclosed detector each employ a single crystal consisting essentially of elemental material selected from the group consisting of elemental tellurium, elemental selenium and a mixture of elemental tellurium and elemental selenium.

Reference to related application

This application is a continuation-in-part of application Serial No. 515,981, filed December 23, 1965, and now abandoned.

Background of the invention

This invention relates to second harmonic generators, parametric oscillators, parametric amplifiers and other parametric devices for use at infrared wavelengths.

Recent proposals for optical communication systems have relied upon the widely-publicized lasers as sources of coherent radiation and upon parametric devices as a means of broadening and making more continuous the frequency bands usable for optical communication while maintaining the coherency of the radiation.

Parametric devices are devices that drive their capability to operate from a substantially nonlinear response to an input signal. In particular, in the optical portion of the spectrum, including the infrared portion, parametric devices typically employ a block of optical material that has a substantial second order polarization coefficient. The input radiation or radiations are propagated through this block of material in an unguided fashion. A wavelike displacement of charge dipoles, i.e., a polarization wave, occurs and produces an energy exchange between multiple input radiations or generates radiations of different frequencies in response to a single input radiation. The first type of device is an amplifier for the radiation that gains energy; the second type of device may be a harmonic generator or, under altered conditions, a parametric oscillator. A parametric oscillator is particularly useful for broadening the frequency band usable for optical communication. Typically, a resonator and a variable direction of propagation in the material are employed in a parametric oscillator; or tuning may be achieved in appropriate parametric materials by variation of temperature.

Although much experimentation has been carried out with such optical parametric devices, their development beyond the point of scientific curiosity has been very slow because of the weakness of the nonlinear effects which are obtained. Among the better materials for such devices are lithium metaniobate, as employed in the apparatus of the copending application of A. A. Ballman et al., Ser. No. 414,366, filed November 27, 1964, now Patent No. 3,262,058, issued July 19, 1966, and assigned to the assignee hereof, and gallium arsenide, as employed in the apparatus of the copending application of A. Ashkin, Ser. No. 480,986, filed Aug. 18, 1965, now Patent No. 3,267,385, issued Aug. 16, 1966, and assigned to the assignee hereof.

Such materials are not necessarily readily employable in the wavelength range of the "atmospheric window" from $8\mu$ to $14\mu$. Thus, it is desirable to find materials and techniques which are readily adaptable for use in optical parametric devices operating in this part of the infrared portion of the spectrum.

Summary of the invention

I have discovered surprisingly strong parametric effects in single crystal tellurium having a low hole concentration. Such a single crystal has been employed in a phase-matched single-pass second harmonic generator. When the crystal was pumped by 170 milliwatts of continuous-wave coherent radiation from a carbon dioxide laser at $10.6\mu$ 10 microwatts of the second harmonic at $5.3\mu$ was obtained. (A micron, $\mu$ is $1 \times 10^{-4}$ centimeters.) The path length of the radiations within the crystal was 9 millimeters. The strength of the effect is thus many times stronger than that hitherto obtainable in other optical materials. Specifically, the second order polarization coefficient (nonlinear coefficient) that describes the nonlinear interaction is at least 400 times the second order polarization coefficient of lithium metaniobate, previously the best phase-matchable nonlinear material. Under Q-switched operation of the $CO_2$ laser, when about 30 kilowatts of peak fundamental power was applied to tellurium, second harmonic power of about one kilowatt was obtained. In addition, a parametric amplifier employing single crystal tellurium has been successfully operated. Single-crystal selenium and single crystals consisting essentially of a mixture of tellurium and selenium offer similar advantages in parametric device.

The strength of the effect is all the more surprising because tellurium and the other crystals which are employed in embodiments of my invention are elemental crystals; whereas the strongest parametric and other nonlinear effects have heretofore been obtained in compound crystals.

My analysis of the second harmonic generator employing tellurium indicates that selenium should also provide strong nonlinear effects throughout much of the infrared portion of the spectrum and would be preferred in the range from .8 micron to 4 microns, where tellurium would produce high attenuation. I have found that selenium has a large second order polarization coefficient $d_{11}$. A mixed single crystal of tellurium and selenium would provide intermediate properties.

The crystals employed are single crystals consisting essentially of elemental material selected from the group consisting of elemental tellurium, elemental selenium and a mixture of elemental tellurium and elemental selenium. The crystals consist essentially of the stated elements in the sense that one or more of these elements form the lattice of the crystal.

Brief description of the drawing

Further features and advantages of the present invention may be obtained from the following detailed description, taken together with the drawing, in which.

*Description of illustrative embodiments*

Figure 1:
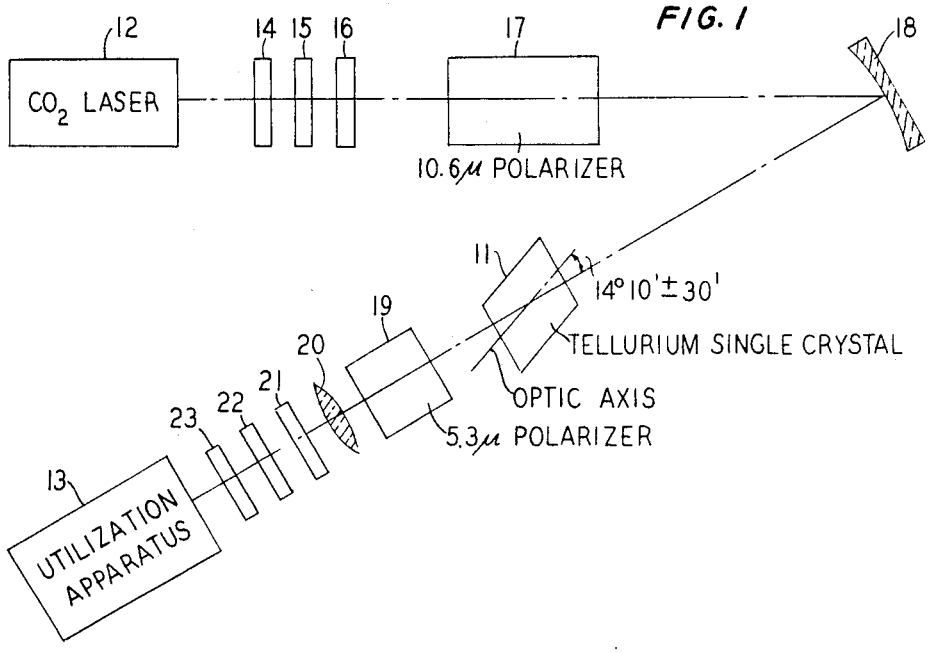
FIG. 1 is a partially schematic and partially block diagrammatic illustration of a preferred embodiment of a second harmonic generator according to the present invention.

In FIG. 1, the second harmonic generator comprises the single crystal 11 of substantially intrinsic tellurium and the carbon dioxide laser 12, which applies to the tellurium crystal 11 a collimated beam of coherent pumping radiation at $10.6\mu$ at an angle of about 14° 10' with respect to the optic axis of crystal 11. Disposed beyond the exit face of crystal 11 is the utilization apparatus 13, which may illustratively be a frequency shifting stage in an optical receiver wherein the 5.3 micron radiation is used in the manner of a local oscillator signal.

Prior to incidence upon tellurium crystal 11, the $10.6\mu$ radiation from laser 12 passes through the $10.6\mu$ bandpass filter 14, to eliminate unwanted fluorescence that may also be emitted from laser 12, the attenuators 15 and 16 to set the pumping power level, the $10.6\mu$ polarizer to polarize the laser radiation, and the concave focusing and reflecting element 18 to assure the appropriate concentration of the pumping radiation in crystal 11. In its passage from tellurium crystal 11 to utilization apparatus 13, the induced $5.3\mu$ second harmonic radiation passes through the $5.3\mu$ polarizer 19, the focusing lens 20, the $10.6\mu$ rejection filter 21, and the $5.3\mu$ bandpass filters 22 and 23. All of these elements tend to eliminate unwanted radiations and components of radiation emanating from tellurium crystal 11.

The tellurium crystal 11 was prepared from a commercially obtained crystal having a nominal impurity content of less than one part per million. The impurity was predominantly copper, which is an acceptor in tellurium. Thus, the charge carriers were predominantly holes; and the hole concentration was less than $1 \times 10^{17}$ per cubic centimeter at room temperature.

It should be particularly noted that, for any particular impurity concentration, effective hole concentration drops rapidly with temperature. At lower temperatures, crystal 11 which may have a much higher impurity content can still provide a hole concentration less than $1 \times 10^{17}$ per cubic centimeter, as preferred. The crystal 11 was cut to provide entrance and exit faces for the radiations normal to a direction lying at an angle of 14° 10' with respect to the optic axis. The normal distance between the entrance and exit faces was 9 millimeters after polishing; and the diameter of crystal 11 in a plane orthogonal to the propagation direction was about 7 millimeters.

The $CO_2$ laser 12 employed was of the kind disclosed in my copending application, Serial No. 495,844, filed October 14, 1965, and assigned to the assignee hereof, with the modification that both mirrors were concave with 50 meters radius of curvature and were spaced at 300 centimeters. Although such reflectors are not confocal and under normal conditions would yield a spot size that is substantially less than the 15 millimeter diameter coupling hole, the highly effective cooling of the laser tube walls produces sufficient defocusing action to expand the mode and sustain powerful coherent wave oscillations. Only a fraction of that available power, namely 170 milliwatts, was applied to the crystal 11 in a direction normal to its entrance and exit faces. In some experiments, dielectric-coated mirrors were employed in laser 12; and output coupling was obtained by coating one mirror to be partially transmissive without a coupling hole.

It should be understood that, when crystal 11 is tellurium, the $CO_2$ laser 12 could be replaced with any other radiation source providing coherent radiation at a wavelength longer than $4\mu$, the bandgap of tellurium. If the crystal 11 is a single crystal of selenium, the coherent radiation source 12 should provide coherent radiation at a wavelength longer than $0.8\mu$, the bandgap of selenium.

The $10.6\mu$ bandpass filter 14 was dielectric-coated press polycrystalline zinc sulfide. The attenuators 15 and 16 were 1 mm. thick periclase (magnesium oxide) windows. The $10.6\mu$ polarizer 17 was a single crystal of tellurium having more than $1 \times 10^{18}$ holes per cubic centimeter at room temperature and having major faces cut parallel to the optic axis and oriented orthogonally to the direction of propagation of the radiation. The reflector 18 was a spherically curved mirror coated to be opaque with vacuum-deposited gold. The $5.3\mu$ polarizer 19 consisted of several silver chloride Brewster-angle plates. In subsequent tests, polarizer 19 was a wire grid polarizer. The focusing lens 20 was pressed polycrystalline zinc sulfide (IR-2) and had a focal length of 52 mm. The $10.6\mu$ rejection filter 18 was a 0.04 inch thick sapphire filter, and the $5.3\mu$ bandpass filters 22 and 23 were dielectric-coated germanium.

In the operation of apparatus substantially similar to that of FIG. 1, the spot size of the coherent radiation was 3.2 square millimeters; and 10 microwatts of coherent wave power at 5.3 microns was obtained at the output of the last $5.3\mu$ bandpass filter 23 in response to the 170 milliwatt continuous-wave input.

Figure 5:
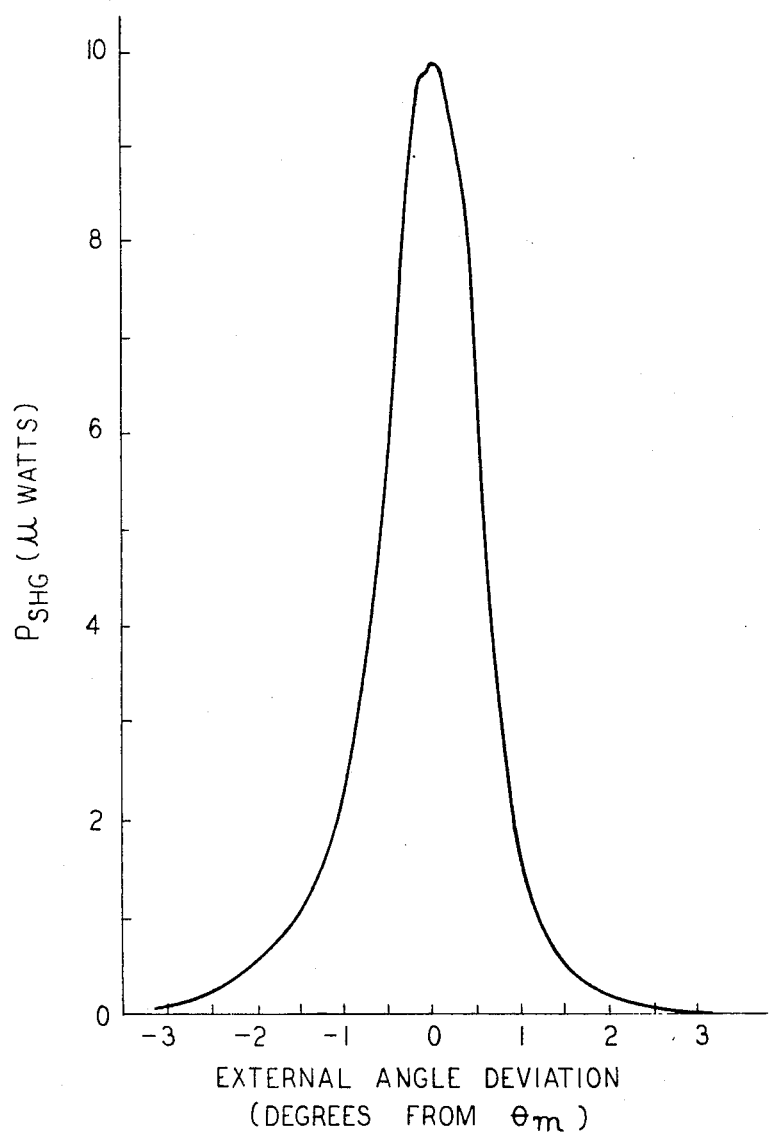
FIG. 5 is a graph showing the variation of the generated second harmonic of the embodiment of FIG. 1 with respect to angular deviation from the direction of maximum second harmonic (phase-matching direction).

With Q-switched operation of the $CO_2$ laser, about one kilowatt of peak second harmonic power was obtained. FIG. 5 shows the variation of the second harmonic $(5.3\mu)$ power as the angle of incidence of the pumping radiation with respect to the optic axis was varied, $\theta_m$ being the 14° 10' above-stated.

The second order polarization coefficient, $d_{11}$, was calculated to be $(1.27 \pm 0.2) \times 10^{-5}$ esu (electrostatic units), which is more than 10,000 times $d_{36}$ of KDP and about 400 times $d_{31}$ of $LiNbO_3$.

Single-crystal tellurium has six-fold symmetry about the c-axis. Thus, three equivalent sets of $x$ and $y$ crystalline axes can be defined, taking the c-axis to be the z-axis. By convention, an x-axis is taken to be a direction through opposite lateral corners of the crystal; and the y-axis is an orthogonal direction, which happens to be orthogonal to opposed lateral surfaces of the hexagonal crystal. With these conventions, the second order polarization wave can be described by the following equations:

$$P_x^{2\omega} = d_{11}(E_x^{\omega})^2 - d_{11}(E_y^{\omega})^2 + 2d_{14}E_y^{\omega}E_z^{\omega} \quad (1)$$
$$P_y^{2\omega} = -2d_{14}E_z^{\omega}E_x^{\omega} - 2d_{11}E_x^{\omega}E_y^{\omega} \quad (2)$$
$$P_z^{2\omega} = 0 \quad (3)$$

Where the $E^{\omega}$ terms represent components of the electric field of the applied pumping radiation polarized in the subscript directions and $d_{11}$ and $d_{14}$ are the second order polarization coefficients (nonlinear coefficients).

For phase-matched second harmonic generation, the phase velocity of the induced radiation is substantially equal to the phase velocity of the pumping radiation. This relationship is also true of the degenerate parametric amplifier or parametric oscillator, for which the signal and idler frequencies, as defined hereinafter, are equal. This property of second harmonic generators and degenerate parametric devices is stated in the above-cited patent of A. A. Ballman et al., at column 3, lines 13–21.

For the case of phase-matched second harmonic generation, then there are two possibilities. The first, which I have utilized, is to propagate the pumping beam as an extraordinary wave in the yz plane at the phase matching angle $\theta_m$ from the c-axis (optic axis) of the tellurium crystal. The electric field of the pumping wave will be polarized predominately in the y direction. In this case, the second harmonic will be an ordinary wave polarized along the x-axis and coupled to the pumping wave with a strength related to $d_{11}$. The pumping wave and the second harmonic propagating at the angle $\theta_m$ will be phase-matched. The angle $\theta_m$ is determined from the incides of refraction and the phase-matching equation:

$$k_\omega + k_\omega = k_{2\omega} \tag{4a}$$

or $$(n_\omega)\omega + (n_\omega)\omega = (n_{2\omega})2\omega \tag{4b}$$

where the $k$'s are propagation vectors of the respective waves $\omega$ is the pump frequency and $2\omega$ is the second harmonic frequency, $n_\omega$ is the index at the pump frequency and $n_{2\omega}$ is the refractive index at the second harmonic frequency.

While only collinear phase-matching is illustrated in the drawing, non-collinear phase-matching is permitted by Equation 4a and is feasible.

It can be shown that this relation is satisfied for propagation of both waves (collinear) at the angle $\theta_m$ with respect to the $c$-axis (for a positive birefringent crystal Te) if $$\sin^2 \theta_m = \frac{(n^e_{2\omega})^2}{(n^o_{2\omega})^2} \left[ \frac{(n^o_\omega)^2 - (n^o_\omega)^2}{(n^e_\omega)^2 - (n^o_\omega)^2} \right] \tag{5}$$

where $n^o_\omega$ is the ordinary index of refraction at the pump frequency, $n^e_\omega$ the extraordinary index at $\omega$ and $n^o_{2\omega}$ the ordinary index at $2\omega$.

Using the values $n^e_\omega = 6.240$, $n^o_\omega = 4.795$ and $n^o_{2\omega} = 4.856$, as reported in the literature, i.e., the article by Caldwell and Fan, Physical Review, 114, 664 (May 1, 1959), I obtain $\theta_m = 14°36'$.

My measured value of $14°10'$ agrees with the limits of experimental error, which limits are about $+30'$.

The other possibility for second harmonic generation is achieved by propagating the pumping wave as an extraordinary wave so that it is polarized predominately in the $xy$ plane with substantial $x$ and $y$ polarization components. The second harmonic is coupled to the pumping wave with a strength related to the coefficient $d_{11}$ and is polarized, as an ordinary wave, in the $y$ direction. The corresponding phase-matching angle $\theta_m$ is about $52°$. Thus, the pumping and second harmonic waves propagate at this angle with respect to the optic axis.

It should be particularly noted that the above results were obtained for single passes through the tellurium crystal and that the output power at the desired wavelength can be greatly increased by providing a resonator disposed about the tellurium crystal.

Figure 2:
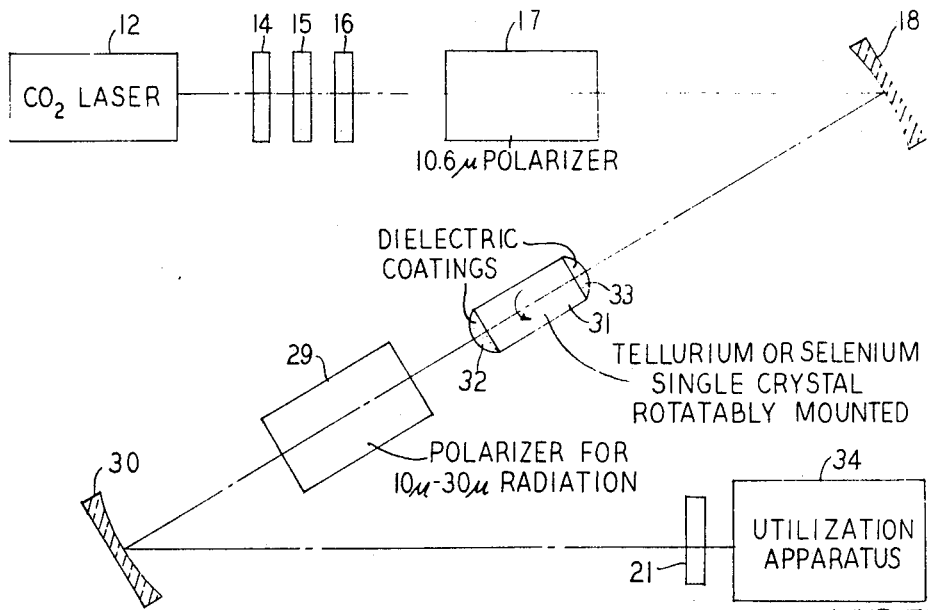
FIG. 2 is a partially schematic and partially block diagrammatic illustration of a preferred embodiment of a parametric oscillator according to the present invention.

An example of a parametric oscillator in which the tellurium crystal is disposed in a resonator is provided in the embodiment of FIG. 2.

In FIG. 2, the tellurium crystal 31 is provided with spherically curved near confocal end surfaces 32 and 33 providing a resonator with its axis at an angle with respect to the optic axis of the crystal. The rear confocal curved surfaces 32 and 33 are polished and dielectrically coated with suitable dielectric materials transparent in the infrared region so that the dielectric coatings act as a matching transformer to $10.6\mu$ radiation but nevertheless provide high reflectivity in the range from about 15 microns to about 30 microns. The $CO_2$ laser 12 provides 10.6 micron radiation as in the embodiment of FIG. 1 and may be the same laser as that disclosed above for the embodiment of FIG. 1. In order to eliminate unwanted frequency components of the laser radiation and to provide a precise adjustment of the pumping power level, the output of laser 12 is directed through the $10.6\mu$ bandpass filter 14 and the attenuators 15 and 16, which are disposed in the radiation path preceding crystal 31. A 10.6 micron polarizer 17 is also inserted in the path of the laser radiation preceding crystal 31. The laser radiation is then focused by the focusing element 18 into the crystal 31 through the curved end surface 33. Radiation emitted through the other curved end surface 32 of crystal 31 is passed through the 10-30 micron polarizer 29 and is focused by the focusing element 30 upon the utilization apparatus 34. Unconsumed 10.6 micron pumping radiation is blocked from utilization apparatus 34 by the 10.6 micron blocking filter 21.

The elements 14, 15, 16, 17, 18 and 21 are the same as those disclosed above in connection with the embodiment of FIG. 1. Polarizer 29 is oriented to pass the induced parametric oscillation emitted from crystal 31 with minimum attenuation. In a typical case, the polarization of the induced radiation at the output of crystal 31 will be orthogonal to the polarization of the unconsumed pumping radiation. The focusing reflector 30 is substantially similar to focusing reflector 18 and focuses the parametric oscillation upon utilization apparatus 34. Filter 21 is a dielectric coated germanium window which blocks the $10.6\mu$ pump radiation but allows the $15-30\mu$ parametric oscillation signal from tellurium to pass unattenuated.

As in the embodiment of FIG. 1, the utilization apparatus 34 could assume many forms but is illustratively apparatus for determining the optical properties of crystals, and need not be discussed further in detail here. For example, the parametric radiation in the 10–30 micron range may induce Raman spectra in a piezoelectric crystal disposed in apparatus 34.

In operation, the $10.6\mu$ pumping radiation, to the extent not consumed on the first pass through crystal 31, can be made to undergo repeated passes through the crystal until a large portion of the pumping radiation is consumed. The result is correspondingly high conversion of the pumping radiation into the induced radiation. Moreover, the presence of a resonator and proper choice of phase-matching angles makes it possible for the induced radiations to be radiations other than the second harmonic radiation, inasmuch as other radiations can now be raised above the oscillation threshold; while the second harmonic is suppressed by the lack of phase-matching for it. Moreover, the orientation and reflectivities of the mirrors of the resonator and the polarization of the pumping radiation can be chosen to favor the parametric oscillation and suppress second harmonic generation even when the parametric oscillation is not phase-matched.

Two radiations, called signal and idler waves, will be induced. The induced radiations will have wavelengths primarily dependent upon the angle between the induced radiations and the optic axis, inasmuch as phase-matching conditions typically will be satisfied for the pumping and induced radiations. That is, the phase velocity of each induced radiation equals the phase velocity of the pumping radiation for the degenerate case; or the Equations 6 and 7 below are satisfied for the general case of either degenerate or nondegenerate operation.

The required conditions are:

$$\omega_{pump} = \omega_{signal} + \omega_{idler} \tag{6}$$

$$k_{pump} = k_{signal} + k_{idler} \tag{7a}$$

$$n_{pump}\omega_{pump} = n_{signal}\omega_{signal} + n_{idler}\omega_{idler} \tag{7b}$$

where the ordinary or extraordinary nature of the $n$'s will be determined by the choice of pump polarization with respect to the $x$ and $y$ crystalline axes. As explained in the above-cited patent of A. A. Ballman et al. at column 5, lines 8–24, the phase velocities of the waves are not all equal for phase-matching in the nondegenerate phase-matched parametric device, that is, one in which $\omega_{signal}$ is different from $\omega_{idler}$. In this case, it is sufficient for phase-matching that Equation 7 is satisfied. Nevertheless, as will be explained hereinafter, not all parametric oscillators and amplifiers employing tellurium or selenium need be phase-matched.

One or both of the signal and idler will be extraordinary; the pumping radiation is an ordinary wave.

Unlike the second harmonic, the signal and idler frequencies are both lower than the second harmonic.

For the degenerate case where $$\omega_{signal} = \omega_{idler} = \frac{\omega_p}{2} \tag{8}$$

where $\omega_p$ is the pump frequency, $$\sin^2 \theta_m = \frac{(n^e \omega_{p/2})^2}{(n^o \omega_p)^2} \left[ \frac{(n^o \omega_p)^2 - (n^o \omega_{p/2})^2}{(n^e \omega_{p/2})^2 - (n^o \omega_{p/2})^2} \right] \quad (9)$$

The signal and idler frequencies can be varied over a wide range from the degenerate values by merely rotating the crystal 31 to change the angle between the direction of propagation and the c-axis. This angle is the phase-matching angle $\theta_m$ for the new set of frequencies that are generated. In general, the useful induced radiations obtained from the tellurium crystal 21 will lie in the range from 10 microns to 30 microns, and the angle of propagation with respect to the optic axis will lie in one of the two ranges 0° to 12° and 16° to 90°. For a given angle $\theta_m$, the frequencies of the phase-matched induced radiations can be varied by varying the ambient temperature of crystal 31, as taught in the article by J. A. Giordmaine et al., Physical Review Letters, volume 14, page 973, June 14, 1965.

For the degenerate case described by Equations 8 and 9 above, the signal and idler wavelengths are both $21.2\mu$. The $\theta_m$ is 6°52′, as calculated by using the existing index of refraction data of the above-cited article of Caldwell and Fan. The $10.6\mu$ pumping radiation is polarized in the x direction as an ordinary wave. The $21.2\mu$ signal and idler radiation propagates collinearly with the pumping radiation and is polarized in the y-z plane as as extraordinary wave propagating at an angle $\theta_m$ with the c-axis. Phase-matching is obtained.

For a nondegenerate case in which the signal and idler wavelengths are $13.7\mu$ and $46.8\mu$ in either order, $\theta_m$ is 5°34′, again calculated from the index of refraction data of the above-cited article of Caldwell and Fan. Relative polarizations of the radiations remain as before; and phase-matching is obtained.

In the parametric oscillator of FIG. 2, it is also feasible to employ separate reflectors disposed about crystal 31 to resonate the induced radiation. In this case, the end surfaces of crystal 31 would preferably be anti-reflection coated.

As an extension of the principles of the foregoing embodiments, it is also possible to employ tellurium as the nonlinear optical medium in a regenerative or nonregenerative parametric amplifier. A nonregenerative amplifier of this type is shown in FIG. 3.

Figure 3:
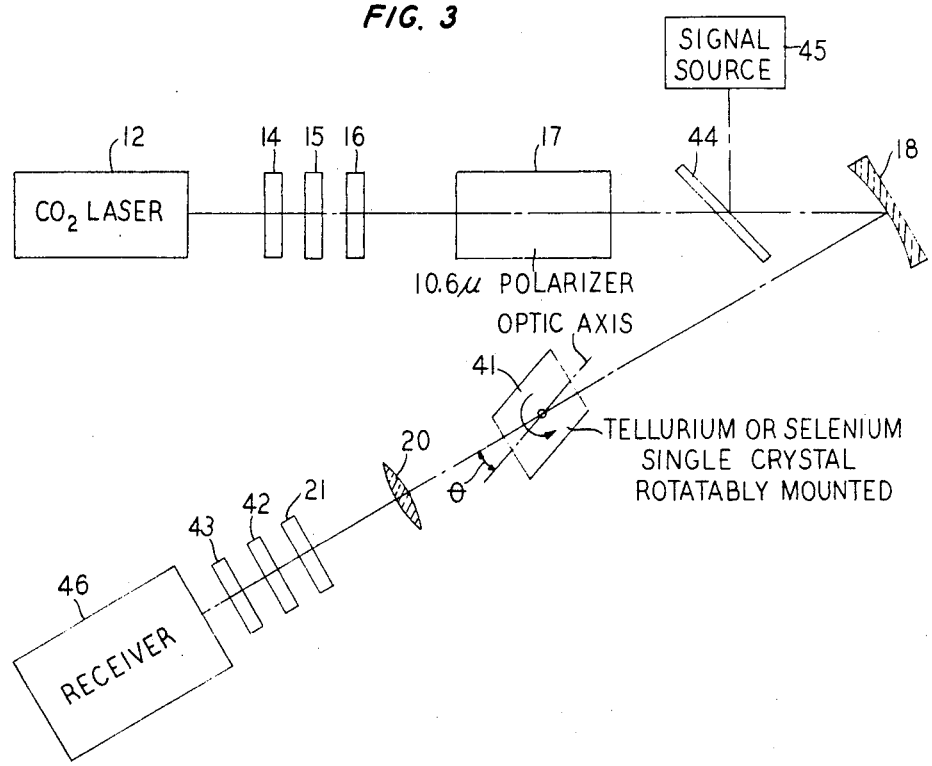
FIG. 3 is a partially schematic and partially block diagrammatic showing of a preferred embodiment of a parametric amplifier according to the present invention.

In FIG. 3 the tellurium crystal 41 is pumped by $10.6\mu$ coherent radiation passed from the $CO_2$ laser 12 through the $10.6\mu$ bandpass filter 14, attenuators 15 and 16, the $10.6\mu$ polarizer 17 and focused upon the crystal 41 by the concave focusing element 18. In addition, the polarized radiation passes through the partially transmissive and partially reflective element 44, which is illustratively a potassium chloride (KCl) plate with partially transmissive dielectric coatings. The element 44 is disposed so that the polarization of the $10.6\mu$ pumping radiation is oblique to its surface and passes readily therethrough with little reflection loss.

Also obliquely incident upon the element 44 from the opposite side thereon and polarized parallel to the surface of element 44 to be reflected readily therefrom is a signal radiation from source 45 at a wavelength of $13.7\mu$, as a first example. The reflected signal radiation propagates collinearly with the pumping radiation.

The tellurium crystal 41 is oriented to receive the $10.6\mu$ pumping radiation from focusing element 18 at an angle with respect to its optic axis that provides phase-matched propagation of the $10.6\mu$ and $13.7\mu$ and $46.8\mu$ idler radiations between the entrance and exit faces thereof. As in the second oscillator example above, the phase-matching angle is 5°34′.

The signal source 45 illustratively comprises a helium-neon laser operating at $13.7\mu$ and an amplitude modulator of the type disclosed in my concurrently filed application, the modulator being responsive to a baseband information signal. The helium-neon laser is of the type described in my article "Collision Processes Leading to Optical Masers in Gases" in the book Atomic Collision Processes, edited by M. R. C. McDowell, North Holland Publishing Company (1964). The receiver 46 illustratively comprises a photoconductor responsive to infrared radiation and suitable baseband amplifiers.

Alternatively, as a second example, with a pumping wavelength of $10.6\mu$ and a signal wavelength of $17.9\mu$ and with the crystal oriented to have its optic axis at an angle of seven degrees (7°) with respect to the pumping radiation and the signal radiation, parametric amplification has been achieved, as disclosed in my article "Parametric Amplification in the Far Infrared," Applied Physics Letters, volume 9, November 1, 1966, pages 332–334. The $10.6\mu$ pump radiation was polarized along the x-axis of the crystal so that it was an ordinary wave. The $17.9\mu$ signal wave, from a far infrared helium-neon laser, was polarized in the y-z plane of the crystal, so that it was an extraordinary wave. In this helium-neon laser, the needed wavelength selection can be most simply obtained by including a potassium iodide prism inside the optical cavity. With pumping and signal waves applied to tellurium crystal 41, an extraordinary idler wave at $25.9\mu$ was generated and phase-matching was achieved.

For details of the $17.9\mu$ far infrared helium-neon laser, see the following articles: C. K. N. Patel, R. A. McFarlane and W. L. Faust, Quantum Electronics III, edited by P. Grivet and N. Bloembergen (Columbia University Press, 1964), pages 561–574; see also W. L. Faust, R. A. McFarlane, C. K. N. Patel and C. G. B. Garrett, Physical Review, volume 133, page A1476 (1964).

In either of the preceding amplifier examples, the entrance and exit faces of crystal 41 are cut to be normal to the direction of propagation of the input radiations. These entrance and exit surfaces are anti-reflection coated with selenium, cadmium sulfide or other suitable dielectric material. From the exit face of crystal 41, the amplified signal radiation, generated idler radiation and the unconsumed pumping radiation then pass through the focusing lens 20 to the $10.6\mu$ rejection filter 21. Thence, the signal radiation passes through the $13.7\mu$ (for the first example) or $17.9\mu$ (for the second example) bandpass filters 42 and 43 and is incident upon the receiver 46, where it is demodulated. The bandpass filters 42 and 43 are dielectric-coated pressed polycrystalline cadmium selenide.

Other components of FIG. 3 are the same as components in FIGS. 1 and 2 to the extent they are numbered the same.

In the operation of the embodiment of FIG. 3, phase-matched amplification is obtained so long as the angle between the common direction of propagation and the optic axis of tellurium crystal 41 is that which satisfied Equation 7b. above. Under these conditions, power will be transferred from the relatively powerful pumping wave to the relatively weak signal wave via the nonlinearly responsive polarization wave in crystal 41.

If the frequency of signal source 45 is changed, the angle between the common direction of propagation and the optic axis of crystal 41 may also be changed in order to maintain the phase-matching condition, as explained above for the parametric oscillator of FIG. 2. Alternatively, the temperature of the crystal may be changed.

Alternatively, one can modify the embodiment of FIG. 3 such that one obtains, as an output, the sum or difference frequency radiation generated in the nonlinear material. The sum or difference frequency radiation is generated from a strong pump signal and weak signal to be detected. Again, phase-matching is provided. The advantage of such a scheme is that one can use a pump at $5\mu$, for example, and detect a weak $25\mu$ signal by detecting instead the difference frequency, or idler, radiation at $6.25\mu$. The amplified idler power will be proportional to the amplified signal power. Detection of the $6.25\mu$ idler is considerably easier than the detection of the amplified signal at 25µ because of the availability of good photoconductive detectors at 6.25µ. The phase-matching angle $\theta_m$ is 6°. The pumping radiation is polarized as an ordinary wave and the input signal radiation is polarized as an extraordinary wave.

Also, one can modify the embodiment of FIG. 3 and detect the sum frequency radiation at 4.16µ for a 5µ pump and 25µ signal, in which case no amplification of the signal will be involved and the pump and signal will both be used up in generating the 4.16µ radiation. The 4.16µ radiation is easier to detect by conventional techniques than is the 25µ signal.

With selenium as the nonlinear material, a pump at one micron and a signal at 13.7µ may be employed to produce an idler at 1.07µ. This idler can be detected by a photomultiplier, which has a frequency response and signal-to-noise ratio superior to those of a photoconductive detector at 13.7µ. Before detection, the 1.07µ information-modulated idler can be amplified by a laser employing neodymium ions ($Nd^{3+}$) in a yttrium aluminum garnet (YAG) host. Alternatively, the sum frequency radiation at 0.93µ (one µ pump, 13.7µ signal) can be generated. In either case, the one (1.00)µ pumping radiation can be supplied from another ($Nd^{3+}$) YAG laser tuned to one of the normally weaker lines of $Nd^{3+}$ at one (1.00)µ. This can be accomplished by an intra-cavity frequency-selective prism in the laser.

A non-phase-matched amplifier can be operated in single-crystal tellurium by supplying the 10.6µ pumping radiation at an angle of 0° with respect to the optic axis in order to generate the strongest possible nonlinear interaction. Specifically, the pumping radiation propagates in the z direction and is polarized in the x direction. A 17.9µ signal radiation, derived from a far infrared helium-neon laser as described above, is directed collinearly with the pumping radiation and is polarized along y-axis. Significantly, the crystal 41 is cut so that it is only 0.1 centimeter thick in the direction of propagation of the radiation. Moreover, both radiations are focused to have equal confocal parameters (similar beam shapes) in the crystal 41. Specifically, the 10.6µ radiation is focused to a minimum diameter of about 0.003 centimeter at the center of crystal 41; and the 17.9µ radiation is focused to a minimum diameter of 0.006 centimeter at the center of crystal 41. Typically, a lens in source 45 will facilitate the adjustment.

It is characteristic of tellurium that the nonlinear effect is so strong that appreciable amplification can be achieved in such thin crystals. Therefore, in such an embodiment with such a short pathlength, phase-matching is relatively unimportant.

An extension of the foregoing principles is that a carefully selected small amount of phase-mismatch in the embodiments described above as phase-matched can provide a net advantage in some circumstances. A more detailed discussion of such refinements can be found in the copending patent application of Messrs. G. D. Boyd and D. A. Kleinman, Serial No. 713,055, filed March 14, 1968, and assigned to the assignee hereof.

It is ordinarily desirable in broadband parametric devices to minimize extraneous resonances in the nonlinear material. To this end, it is desirable for all of the foregoing devices to employ tellurium or selenium in which the free charge concentration is not significantly greater than the $1 \times 10^{17}$ carriers per cubic centimeter.

It is not necessary to use photoconductors as detectors in a system like that shown in FIG. 3. The extremely large second order polarization coefficients of tellurium and selenium have the order of magnitude that makes single crystals of these materials useful as square-law type detectors of amplitude modulation carried by infrared radiations.

Figure 4:
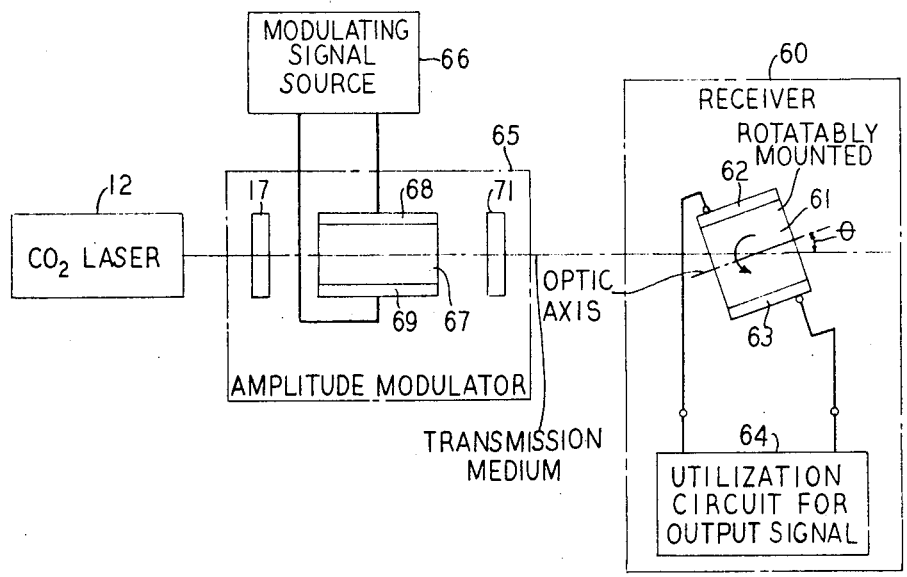
FIG. 4 is a partially schematic and partially block diagrammatic showing of a preferred embodiment of a detector according to the present invention, employed in a communication system.

A preferred form of detector is shown in FIG. 4 and is specifically claimed in my copending application, Serial No. 515,793. The output beam of a $CO_2$ laser 12 is amplitude modulated by a modulator 65 and then is transmitted through the transmission medium to the receiver 60 where a substantial replica of the original modulating-signal is obtained as an output.

The amplitude modulator 65 comprises in tandem a 10.6µ polarizer 17, a polarization modulator 67 with electrodes 68 and 69, and an analyzer 71 having its optic axis crossed to that of polarizer 17 in order to pass the orthogonal polarization. To the electrodes 68 and 69 is applied the information signal, i.e., baseband modulating signal, from a suitable source 66, e.g., a microphone.

The polarization modulator 67 may illustratively be a cell such as that disclosed in the copending application of P. L. Richards et al., Serial No. 334,146, filed December 30, 1963, and assigned to the assignee hereof.

The detector 60 comprises a single crystal 61 of tellurium having an effective hole concentration between $1 \times 10^{17}$ and $1 \times 10^{19}$ per cubic centimeter and having the electrodes 62 and 63 disposed on parallel lateral surfaces of crystal 61 and connected to the utilization circuit 64. Electrodes 62 and 63 are separated from one another approximately one centimeter. The optic axis of crystal 61 makes a very small angle with respect to the propagation direction in order to maintain the desired phase-matching condition described hereinafter. The angle is less than 10 degrees for modulation frequencies lower than infrared frequencies.

Typically, electrodes 62 and 63 have a capacitance with respect to each other less than a few µµf., and the crystal 61 has a resistance between electrodes 62 and 63 on the order of magnitude of one ohm. The product of this resistance and capacitance should be substantially less than one quarter of the shortest period of amplitude modulation carried by the infrared radiation in order to obtain an appreciable and relatively undistorted response from the detector. It is readily seen that the detector is a fast detector for all modulation having any frequency in the microwave range. The resistance component of the RC time constant can be reduced by growing crystal 61 with a higher dopant concentration, with some reduction in sensitivity.

The higher dopant concentration may provide some extraneous resonances; but these are not a serious problem provided the absorption of the received radiation is sufficiently low to permit it to penetrate the crystal.

The utilization circuit 64 illustratively comprises conventional cascaded voltage and power amplifiers and a loudspeaker.

In operation, the 10.6µ radiation produced by $CO_2$ laser 12 is amplitude modulated by the modulator 65 in response to the signal from source 66 and is transmitted through the transmission medium to the detector 60. As the modulated radiation passes through the crystal 61, almost parallel to its optic axis, it produces a polarization wave therein. This polarization wave is essentially the motion of electric charge dipoles. In the absence of modulation, the polarization wave would inherently have a bias, or direct-current component, which is related to the intensity of the radiation because of the nonlinearity of the response of the polarization wave to the incident radiation. In the presence of modulation, this D.C. component follows the modulation. Since a polarization wave involves motion of charge dipoles, a voltage appears between electrodes 62 and 63 at the modulation frequency. This voltage may be amplified and employed in the manner conventional for detected signals.

Even at modulation frequencies below microwave frequencies, the modulation has associated with it a propagating electromagnetic field having a wavelength equal to the modulation wavelength. Phase-matching of this field with the carrier infrared radiation becomes desirable as the modulation frequency approaches the microwave range. Otherwise, the effects of destructive interference upon the induced field, i.e. induced radiation, at the modulation frequency become considerable. Thus the angle of propagation with respect to the optic axis is preferably directly related to the modulation frequency in order to obtain phase-matching. For microwave modulation, the angle is less than 10 degrees.

The embodiment of FIG. 4 is also useful as a beat frequency detector for infrared radiations having wavelengths longer than the bandgap wavelength of the crystal.

In all cases, the above-described arrangements are illustrative of a small number of the many possible specific embodiments that can represent applications of the principles of the invention.

It is apparent that a single crystal consisting essentially of elemental material that is a mixture of elemental tellurium and elemental selenium is also within the scope of my invention and will provide an intermediate range of operation with respect to wavelengths, inasmuch as it is known that a mixture of semiconductive materials has a bandgap intermediate the bandgaps of the materials of which it is a mixture. Other properties also assume intermediate values, according to known principles.

Numerous and varied other arrangements can readily be devised in accordance with these principles by those skilled in the art without departing from the spirit and scope of the invention.

I claim:

1. In combination, a single crystal consisting essentially of elemental material selected from the group consisting of elemental tellurium, elemental selenium and a mixture of elemental tellurium and elemental selenium, means for directing through said materia polarized coherent infrared pumping radiation to induce another radiation of differing wavelength, said pumping radiation having a first wavelength longer than the bandgap wavelength of said material and being directed with respect to the optic axis of said material at an angle providing a substantial nonlinear effect in propagating through said material, and means for abstracting for utilization a portion of said induced radiation.

2. A combination according to claim 1 in which the material is selected from the group consisting of elemental tellurium and elemental selenium.

3. A combination according to claim 1 in which the crystal consists essentially of elemental tellurium.

4. A combination according to claim 1 in which the angle is an angle that permits the induced radiation to be predominantly second harmonic radiation.

5. A combination according to claim 1 including a resonator disposed about the crystal to resonate the induced radiation and in which the angle lies in a range that permits the induced radiation to occur predominantly at two frequencies the sum of which equals the frequency of the pumping radiation.

6. A combination according to claim 1 in which the single crystal is a crystal of the element tellurium with opposed faces cut normal to a direction that makes an angle of $14°10'±30'$ with respect to the optic axis of the crystal, and in which the angle of the pumping radiation with respect to the optic axis is $14°10'±30'$, whereby the induced radiation is predominantly the second harmonic.

7. In combination, a gas laser employing an active medium including carbon dioxide and adapted to produce a beam of coherent radiation at a wavelength in the atmospheric transmission window from $8\mu$ to $14\mu$, a single crystal consisting essentially of elemental material selected from the group consisting of elemental tellurium, elemental selenium and a mixture of elemental tellurium and elemental selenium, said material having a charge carrier concentration less than $1 \times 10^{17}$ holes per cubic centimeter, said crystal having opposed faces intercepting a direction at an angle with respect to the optic axis, said crystal being oriented to receive said beam along said direction, whereby a radiation of differing wavelength is induced, and means for abstracting for utilization a portion of said induced radiation.

8. A combination according to claim 7 in which the material is selected from the group consisting of elemental tellurium and elemental selenium.

9. A combination according to claim 7 in which the crystal consists essentially of elemental tellurium.

10. A combination according to claim 7 in which the crystal has the opposed faces formed to be curved, said opposed faces being dieelectrically coated to have high internal reflectivity for said induced radiation having a wavelength in the range from $15\mu$ to $30\mu$ while improving the impedance match for the beam from the carbon dioxide laser as said beam passes through said opposed faces.

11. A combination according to claim 10 in which the crystal is a tellurium crystal and the dielectric coating is selected from the group consisting of selenium and cadmium sulfide.

12. A combination according to claim 1 in which the means for directing the pumping radiation includes a laser supplying said pumping radiation with a wavelength lying in the atmospheric window from $8\mu$ to $14\mu$, the single crystal is a tellurium crystal having opposed faces intercepting the direction of the pumping radiation, the angle said direction makes with the optic axis of said crystal lying in one of the ranges $0°$ to $12°$ and $16°$ to $90°$ to permit the induced radiation to occur predominantly at two frequencies the sum of which equals the frequency of the directed radiation, said combination including a source of signal radiation at one of the two frequencies and means for directing the signal radiation through the crystal to interact with the pumping radiation, the other frequency of induced radiation being the idler frequency.

13. A combination according to claim 1 including means for directing through said material polarized coherent infrared signal radiation of wavelength equal to the wavelength of one said induced radiation, said signal radiation having a second wavelength longer than the bandgap wavelength of said material and being directed with respect to the optic axis of said material at an angle providing amplification of said signal radiation.

14. A combination according to claim 13 in which the wavelengths and angles of the pumping radiation and the signal radiation are mutually adapted to provide substantial phase-matching among said pumping radiation, said signal radiation and another induced radiation called the idler wave.

15. A combination according to claim 1 in which the angle lies in a range that permits the induced radiation to occur predominantly at two frequencies the sum of which equals the frequency of the pumping radiation and in which the means for directing the pumping radiation includes means for polarizing the pumping radiation as an ordinary wave.

16. A combination according to claim 15 including a source of a second supplied radiation at a frequency equal to one of the two frequencies of the induced radiation, said source supplying said second radiation polarized as an extraordinary wave.

17. A combination according to claim 15 including a resonator oriented to resonate at least one induced radiation that is propagating as an extraordinary wave.

18. A parametric amplifier comprising a single crystal consisting essentially of elemental material selected from the group consisting of elemental tellurium, elemental selenium and a mixture of elemental tellurium and elemental selenium, means for directing through said material polarized coherent infrared pumping radiation to induce another radiation of differing wavelength, said pumping radiation having a first wavelength longer than the bandgap wavelength of said material and being directed with respect to the optic axis of said material at an angle providing a substantial nonlinear effect in propagating through said material, means for directing through said material a signal radiation of frequency equal that of an induced radiation in a direction providing amplification of said signal radiation, and means for abstracting amplified signal radiation.

19. A parametric amplifier according to claim 18 in which the material is selected from the group consisting of elemental tellurium and elemental selenium.

20. A parametric amplifier according to claim 18 in which the crystal consists essentially of elemental tellurium.

No references cited.

ROY LAKE, *Primary Examiner.*

DARWIN R. HOSTETTER, *Assistant Examiner.*

U.S. Cl. X.R.

307—88.3; 321—69; 331—107; 329—144